United States Patent [19]

Devenyi et al.

[11] Patent Number: 5,691,842
[45] Date of Patent: *Nov. 25, 1997

[54] OPTICAL SIGHT ASSEMBLY

[75] Inventors: Gabor Devenyi, West Pentang; Conrad Stenton, Midland, both of Canada

[73] Assignee: Hughes Aircraft Company, Los Angeles, Calif.

[*] Notice: The term of this patent shall not extend beyond the expiration date of Pat. No. 5,548,442.

[21] Appl. No.: 651,171

[22] Filed: May 21, 1996

Related U.S. Application Data

[62] Division of Ser. No. 73,824, Jun. 8, 1993, Pat. No. 5,548,442.

[51] Int. Cl.$^6$ ................................................. G02B 23/00
[52] U.S. Cl. ...................... 359/432; 359/421; 359/422
[58] Field of Search ............................. 359/399, 420–422, 359/381, 821, 694, 696, 823, 353–355

[56] References Cited

U.S. PATENT DOCUMENTS

| | | | |
|---|---|---|---|
| 3,572,886 | 3/1971 | Curtiss | 359/421 |
| 4,961,636 | 10/1990 | Gaul et al. | 359/381 |
| 5,548,442 | 8/1996 | Devenyi et al. | 359/421 |

*Primary Examiner*—Thong Nguyen
*Attorney, Agent, or Firm*—Gordon R. Lindeen, III; Michael W. Sales; Wanda K. Denson-Low

[57] ABSTRACT

An optical assembly (10) includes a first plurality of optical elements (14) providing the viewer a first field of view and a second plurality of optical elements (18) that, when moved into the optical path (16), provides the viewer with a second field of view. A support structure (36) for the second plurality of optical elements (18) includes a permanent magnet (64) that is disposed to cause a switch (66) located on the housing (12) of the optical assembly (10) to close. The changing of the position of the switch (66) results in a signal being provided to identify to the viewer which field of view is being presented by the assembly (10).

20 Claims, 2 Drawing Sheets

OPTICAL SIGHT ASSEMBLY

The instant application is a Divisional Application of the U.S. application, Ser. No. 08/073,824, filed Jun. 8, 1993, now U.S. Pat. No. 5,548,442.

The present invention generally relates to an optical assembly and, in particular, relates to one such assembly having means for selecting different optical fields of view and means for magnetically signalling the viewer which of the different optical fields of view is selected.

There are many optical assemblies wherein it is highly desirable and advantageous to have more than one optical field of view available to the operator. Under many such some circumstances however, it is then critical that the operator correctly and reliably know exactly which optical field of view has been selected.

Quite often however, such circumstances are usually accompanied by other difficulties as well. For example, one such circumstance may be a battlefield. Under battlefield conditions it is highly advantageous to have an optical sight that has both a wide field of view and a narrow field of view available to the user. For example, it is quite advantageous for a gunner to be able to select a target over a wide range of distances. Hence, an optical sight having one set of optical elements having a wide field of view, for relatively closer range targets and a second set of optical elements which, when positioned in the optical path of the first set of optical elements, presents a narrow field of view, for relatively distant targets, provides a gunner with the ability to select, track and/or attack targets over a large tactical battlefield. It follows, naturally, that for such an optical assembly to be effective it is critical that the operator of the sight must know which optical field of view is in use when a target is being selected. Conventionally, this is accomplished by sophisticated electronic circuitry.

However, under modern battlefield conditions, it must be anticipated that all equipment in the field will be subjected to potentially damaging and interfering forms of electromagnetic energy interference (EMI) and radio frequency energy interference (RFI) Such energy interference is known to interfere with electronic circuitry to the end that either the circuitry becomes unreliable or ceases to function. At best, either of these conditions render the advantages of a multiple field of view optical assembly ineffective. In the worst case, such energy interference can cause the electronic circuitry to yield erroneous outputs, thereby causing the user to misjudge the distance to a target, i.e., the user may aim far beyond a close target if an erroneous signal indicates that the telescope path is being used.

Consequently, it is highly desirable to provide an optical assembly that not only is capable of presenting the viewer with different optical fields of view but also provides a reliable indication to the viewer as to which field of view is currently in use regardless of the presence of EMI or RFI.

SUMMARY OF THE INVENTION

Accordingly, it is one object of the present invention to provide an optical sight assembly that overcomes the above-recited difficulties of conventional multiple optical fields of view assemblies.

This object is accomplished, at least in part, by an optical assembly having means for selecting the optical field of view presented to the viewer and means for magnetically indicating which optical field of view is being presented.

Other objects and advantages will become apparent to those skilled in the art from the following detailed description of the invention read in conjunction with the attached drawings and the claims appended hereto.

BRIEF DESCRIPTION OF THE DRAWINGS

The drawing, not drawn to scale, includes.

DETAILED DESCRIPTION OF THE INVENTION

Figure 1A:
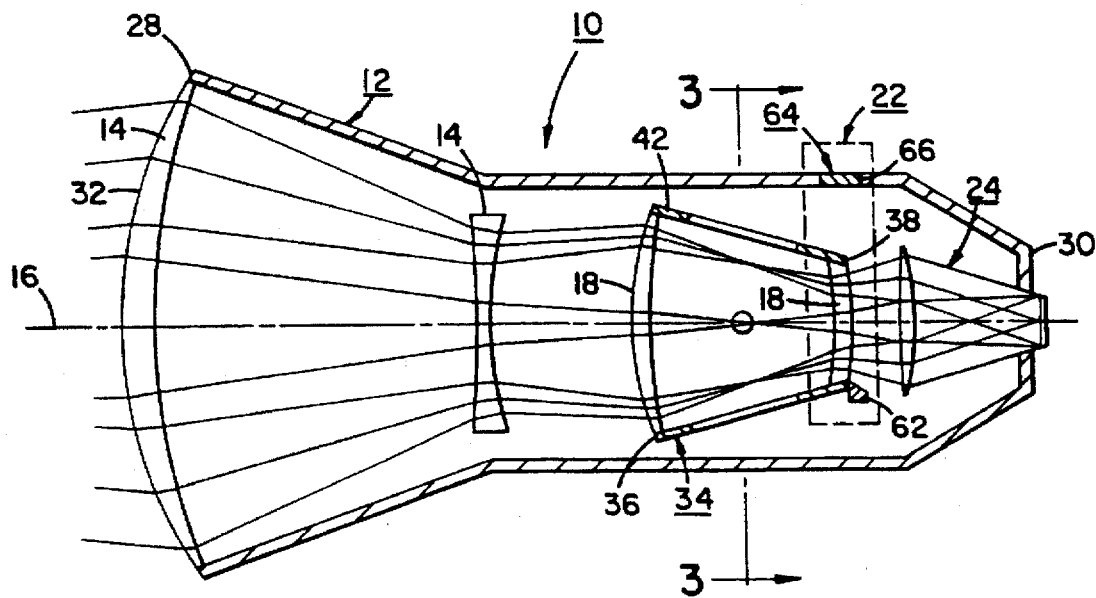
FIGS. 1A and 1B which are a schematic diagrams of an optical assembly embodying the principles of the presented invention.

An optical assembly, generally indicated at 10 in the drawings and embodying the principles of the present invention, includes a housing 12 having a first plurality of optical elements 14 defining an optical path 16 having a first field of view, a second plurality of optical elements 18, means 20 for selectively introducing the second plurality of optical elements 18 into the optical path 16 such that a second field of view is established therealong, and means 22 for providing a magnetic signal indicative of the position of the second plurality of optical elements 18. Preferably, the optical assembly 10 also includes an eyepiece section 24 having a reticle 26 associated therewith.

Figure 1B:
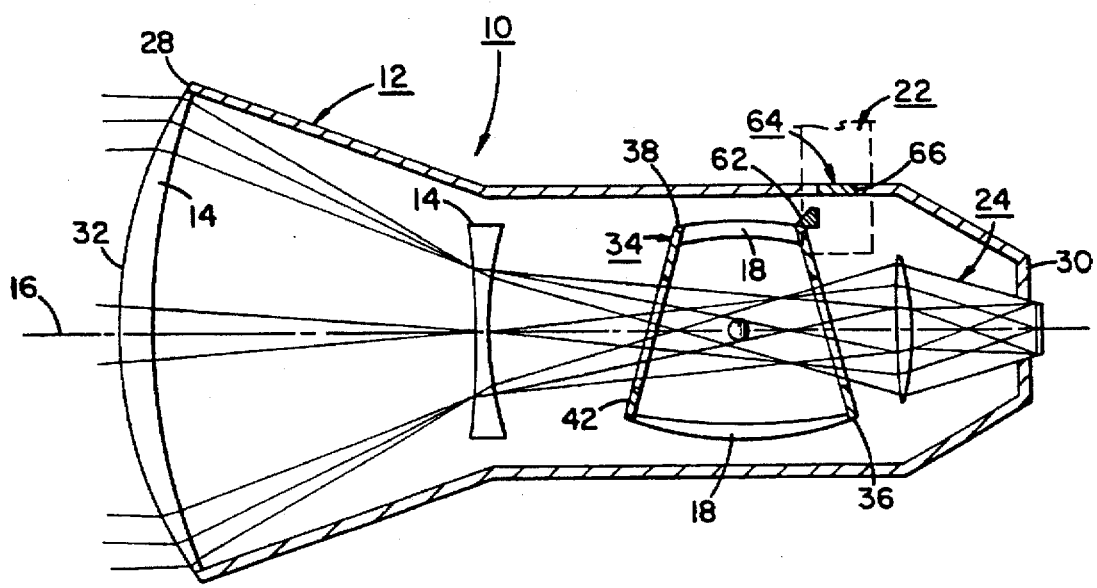
Figure 2:
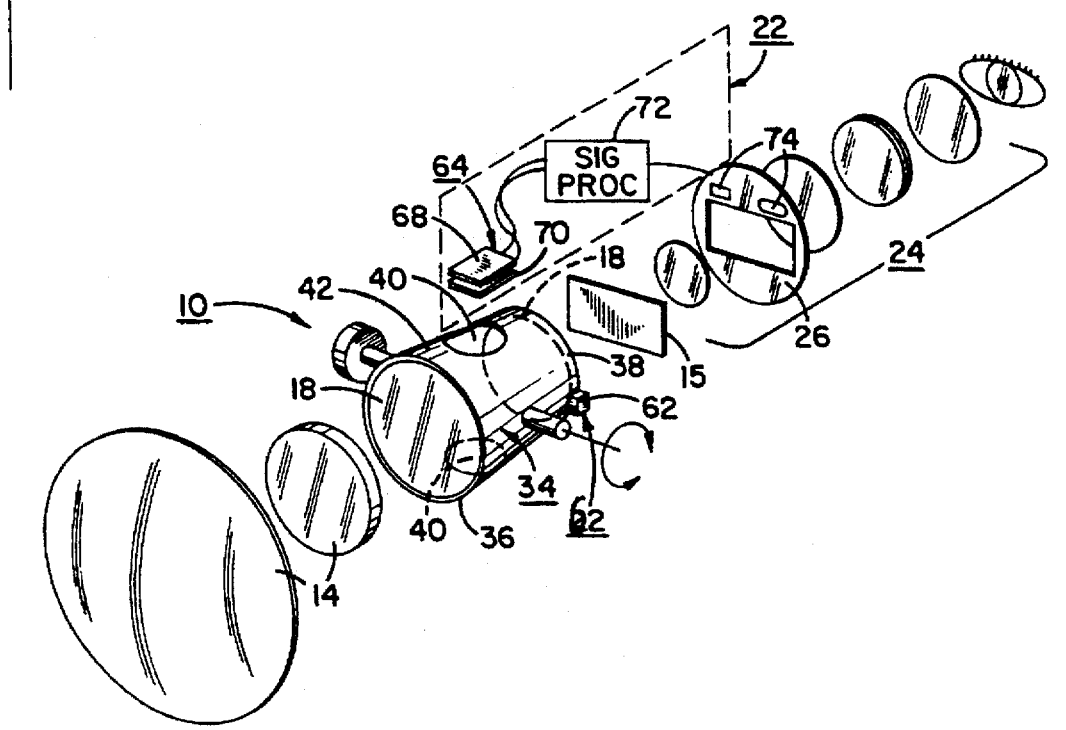
FIG. 2 which is a perspective diagram of the optical assembly shown in FIG. 1.

FIGS. 1a and 1b depict one view of the invention with the second plurality of optical elements in the optical path (FIG. 1a) and another view with these elements rotated out of the optical path (FIG. 1b). FIG. 1a depicts an embodiment useful in a narrow field of view application while FIG. 1b depicts a wide field of view application. The ray paths illustrated in FIGS. 1a and 1b are for illustration only and it will be understood by those skilled in the art that the illustrated ray paths are indicative of what the detector at light viewing end 30 "sees". (The rest of the light rays entering, for example, member 32 are not illustrated.) Further, in one embodiment, for example as shown in FIG. 2, the optical assembly 10 can also include an infrared image converter 15 disposed between the first plurality of optical elements 14 and the eyepiece section 24. As known in the art, an infrared image converter changes an incoming infrared image to an image that is visible to the operator.

In one preferred embodiment, the housing 12 is generally cylindrical in cross-section having different cross-sectional diameters to accommodate various diameters of the first plurality of optical elements 14. It will be understood that the housing 12 could have many other cross-sectional shapes, including, for example, a square, rectangle or elliptical shape. The housing 12 includes a light receiving end 28 and a light viewing end 30. As shown in FIGS. 1A and 1B, the housing 12 is sealed at the light receiving end 28 thereof by one member 32 of the first plurality of optical elements 14 and is adapted to accommodate, in a sealing manner the eyepiece section 24 at the light viewing end 30. In one embodiment, the housing 12 is formed from high impact plastic, although many other materials could also be used.

As shown in the Figures the first plurality of optical elements 14 defining the first optical path 16 are fixed within the housing 12 along the optical path 16 of the assembly 10. In the preferred embodiment, the first plurality of optical elements 14 are selected to provide a viewer with a wide angle field of view.

As shown in FIG. 2, the second plurality of optical elements 18 are, in the preferred embodiment, arranged within a support structure 34. The support structure 34 is preferably disposed within the housing 12 so that the second plurality of optical elements 18 can be moved into the optical path 16 by the means 20 from outside the housing 12 and readily accessible to the operator. Preferably, the second plurality of optical elements 18 are disposed at first and second ends, 36 and 38, respectively, of support structure 34. Such an arrangement, by the second plurality of optical elements 18 supporting both ends, 36 and 38, of the support structure 34, allows lightweight material to be used in the construction of the support structure 34. If, for example, all of the second plurality of optical elements 18 were disposed at one end 36 of the support structure 34, then the support structure 34 would require a more rigid material. In the embodiment shown, the support structure 34 includes openings 40 through the wall 42 thereof, the openings 40 being disposed such that when the second plurality of optical elements 18 are positioned out of the optical path 16 of the assembly 10, light entering the light receiving end 28 of the housing 12 reaches the eyepiece section 24 via the first plurality of optical elements 14 along the optical path 16 without interference.

Figure 3:
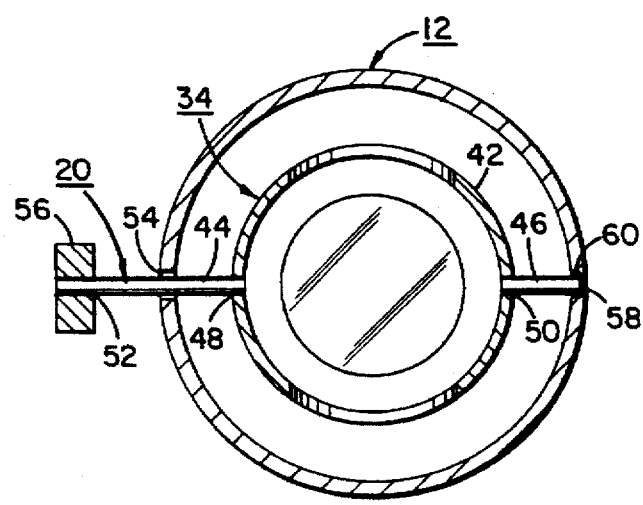
FIG. 3 is a cross-sectional view of the optical assembly taken along the line 3—3 of FIG. 1.

As shown in FIG. 3, the support structure 34 for the second plurality of optical elements 18 further includes first and second shaft sections, 44 and 46, respectively, each having a first end, 48 and 50, respectively, affixed to the wall 42 of the support structure 34 opposite each other. A second end 52 of the first shaft section 44 distal the wall 42 of the support structure 34 extends through an opening 54 in the housing 12 and is provided with a knob 56 or other means to allow the operator to rotate the support structure 34. In the embodiment shown, a second end 58 of the second shaft section 46 distal the wall 42 of the support structure 34 terminates within the housing 12 in a recess 60 sized to accept the second end 56. The recess 60 is disposed opposite the opening 54 through which the first shaft section 44 passes and is sized to allow the second end 58 of the second shaft section 46 to rotate therein.

The support structure 34 also, in the preferred embodiment, includes the means 22 for providing a magnetic signal indicative of the position of the second plurality of optical elements 18. In the embodiment shown, the means 22 includes a permanent magnet 62 affixed to wall 42 of the support structure 34. In addition, the means 22 includes a magnetically actuated switch 64 affixed to the housing 12. In the embodiment shown in the figures, the magnetically actuated switch 64 is disposed in a slot 66 formed in the housing 12. Preferably, the magnetically actuated switch 64 is a reed switch and includes first and second contacts, 68 and 70, respectively. In the operation of the embodiment shown, the contacts, 68 and 70, of the switch 64 are spaced apart when the support structure 34 is positioned such that the second plurality of optical elements 18 are out of the optical path 16, i.e., during wide field of view operation. When the support structure 34 is rotated to position the second plurality of optical elements 18 into the optical path 16, i.e., during narrow field of view operation, the permanent magnet 62 rotates with the wall 42 of the support structure 34 to become sufficiently proximate the slot 66 in the housing 12 to cause the contacts, 68 and 70, to close thereby making electrical contact with each other. The position of the first and second contacts, 68 and 70, is monitored by a conventional signal processing circuitry 72 that, in the preferred embodiment, provides a signal to field of view indicator 74 disposed on the reticle 26 within the eyepiece section 24. Hence, the operator can, without changing position with respect to the eyepiece section 24, know which field of view is being presented.

Advantageously, then, it will be recognized that the assembly 10 described herein is not susceptible to either EMI or RFI effects and that the magnetically actuated switch 64 will close only when subjected to the magnetic field of the permanent magnet 62 on the support structure 34.

Although the optical assembly 10 has been described herein with respect to a particular embodiment, it will be understood that other arrangement and configurations may be provided that nonetheless do not depart from the spirit and scope of the present invention. For example, instead of a second plurality of optical elements, the narrow field of view may be accomplished by the use of a single optical element. Hence, the present invention is deemed limited only by the appended claims and the reasonable interpretation thereof.

What is claimed is:

1. An optical assembly comprising:

a housing;

a plurality of optical elements, said plurality of optical elements being disposed within said housing and defining an optical path, at least one of the plurality of optical elements being a fixed optical element and at least one of the other plurality of optical elements being a moveable optical element, wherein the fixed optical element provides a first field of view and the combination of the fixed optical element and the moveable optical element provides a second field of view;

means for selectively introducing or removing said moveable optical element into or out of said optical path to selectively provide the second field of view; and magnetic means for indicating the position of said moveable optical element within said housing to indicate the field of view selected, said magnetic means including a magnetic switch affixed to said housing and a permanent magnet affixed to said moveable optical element, wherein movement of the moveable optical element causes the permanent magnet to be moved in relation to the magnetic switch to indicate whether the moveable optical element is into or out of the optical path.

2. The optical assembly according to claim 1 further comprising an eyepiece section through which a view along the optical path is presented to an operator of said assembly.

3. The optical assembly according to claim 2 wherein the eyepiece section includes a reticle, said reticle being responsive to a signal indicating the position of the moveable optical element.

4. The optical assembly according to claim 2, wherein the means for selectively introducing or removing includes first and second shaft sections affixed to a wall of the moveable optical element, said first shaft section and said second shaft section being disposed on said wall opposite each other such that the optical element can be rotated.

5. The optical assembly according to claim 4 wherein the first shaft section extends through the housing such that it is accessible to an operator and said second shaft section terminates in a recess in the housing where the recess is of a size to permit the second shaft section to rotate therein.

6. The optical assembly according to claim 1 wherein the fixed optical element provides a wide angle field of view and the combination of the fixed optical element and the moveable optical element provides a narrow angle field of view.

7. The optical assembly according to claim 1 further comprising an infrared image converter disposed between the fixed optical element and an eyepiece section, said infrared optical converter converting an infrared image to a visible image.

8. The optical assembly according to claim 1 wherein the moveable optical element is rotatably mounted within the housing, said moveable optical element being secured to a rotatable support structure, said permanent magnet being secured to the support structure such that the position of the permanent magnet within the housing changes when the support structure is rotated.

9. The optical assembly according to claim 1 wherein the permanent magnet is positioned on the moveable optical element such that when the moveable optical element is disposed in the optical path, the permanent magnet is proximate the magnetic switch and when the moveable optical element is disposed outside of the optical path, the permanent magnet is distal the magnetic switch.

10. The optical assembly according to claim 1 wherein the magnetic switch is a reed switch.

11. The optical assembly according to claim 1, wherein the magnetic switch is disposed within a recess in the housing.

12. An optical assembly comprising:

a housing;

a fixed optical element positioned within the housing in a fixed position along an optical path, said fixed optical element being positioned at one end of the housing;

an eyepiece section through which a view along the optical path is presented to an operator, said eyepiece section being positioned within the housing along the optical path at an end of the housing opposite to the fixed optical, element;

a moveable optical assembly positioned within the housing relative to the optical path, said moveable optical assembly including a plurality of optical lenses positioned on a support structure, said support structure including an opening, wherein the moveable optical assembly is moveable such that the optical lenses are positioned along the optical path in one position and the opening is positioned along the optical path in another position, said support structure including a permanent magnet, said permanent magnet being positioned relative to a magnetic switch to provide an indication of the position of the moveable optical assembly, the combination of the fixed optical element and said moveable optical assembly providing a narrow field of view when the optical lenses are positioned along the optical path and said fixed optical element providing a wide field of view when the opening of the moveable optical assembly is positioned along the optical path; and a plurality of shaft sections, said shaft sections selectively positioning the moveable optical, assembly said shaft sections rotating the moveable optical assembly relative to the optical path to position the optical lenses in the optical path for the narrow field of view and positioning the opening in the optical path for the wide angle field of view, said shaft sections being connected to the support structure.

13. The optical assembly according to claim 12 wherein the eyepiece section includes a reticle, said reticle being connected to the magnetic switch, and providing an indication of the position of the moveable optical assembly.

14. The optical assembly according to claim 12 wherein the plurality of shaft sections include first and second shaft sections affixed to a wall of the support structure, said first shaft section and said second shaft section being disposed on said wall opposite to each other such that said support structure can be rotated, wherein said first shaft section extends through the housing such that it is accessible to an operator and said second shaft section terminates within the housing.

15. The optical assembly according to claim 12 wherein the magnetic switch is a reed switch positioned within a recess in the housing.

16. An optical assembly comprising:

a housing;

a plurality of optical elements disposed within said housing and positioned relative to an optical path extending the length of the housing, one of the plurality of optical elements being a fixed optical element positioned along the optical path and providing a first field of view, and at least one of the other plurality of optical elements being a moveable optical element, wherein the combination of the fixed optical element and the moveable optical element provide a second field of view, said moveable optical element being rotatably mounted within the housing by a rotating structure secured to the moveable optical element and the housing in a manner that allows the moveable optical element to be selectively introduced into or removed out of the optical path; and a magnetic system positioned to indicate the position of the moveable optical element so as to provide an indication of the first or second field of view, said magnetic system including a permanent magnetic and a magnetic switch, wherein the permanent magnetic is aligned with the magnetic switch upon rotation of the moveable optical element to indicate whether the moveable optical element is into or out of the optical path.

17. The optical assembly according to claim 16 further comprising an eye piece section through which a view along the optical path is presented to an operator of the optical assembly.

18. The optical assembly according to claim 16, wherein the permanent magnetic is positioned on the moveable optical element and the magnetic switch is positioned on the housing, such that when the moveable optical element is rotated into the optical path, the permanent magnetic is positioned proximate to the magnetic switch and when the moveable optical element is disposed outside of the optical path, the permanent magnetic is distal the magnetic switch.

19. The optical assembly according to claim 16, wherein the magnetic switch is disposed within a recess in the housing.

20. The optical assembly according to claim 16 wherein the at least one of the other plurality of optical elements includes a plurality of moveable optical lenses positioned on a support structure, said rotating structure including first and second shaft sections affixed to a wall of the support structure, said first shaft section and said second shaft section being disposed on said wall opposite to each other such that such support structure can be rotated, wherein said first shaft section extends through the housing such that it is assessable to an operator and second shaft section terminates in the housing.

* * * * *